(12) United States Patent
Bianco et al.

(10) Patent No.: US 6,601,726 B2
(45) Date of Patent: Aug. 5, 2003

(54) DEVICE FOR SECURING A LID ON A CONTAINER

(76) Inventors: Joseph J. Bianco, deceased, late of N. Stonington, CT (US); by Angelina A. Bianco, legal representative, 40 Old Colony Rd., N. Stonington St., CT (US) 06359; John V. Bianco, 33 Green St., #2, Jamaica Plain, MA (US) 02130

( * ) Notice: Subject to any disclaimer, the term of this patent is extended or adjusted under 35 U.S.C. 154(b) by 0 days.

(21) Appl. No.: 09/837,514

(22) Filed: Apr. 18, 2001

(65) Prior Publication Data

US 2002/0153378 A1 Oct. 24, 2002

(51) Int. Cl.[7] ............................................. B65D 45/02
(52) U.S. Cl. .................. 220/315; 220/912; 126/373; 292/288
(58) Field of Search ................................. 220/912, 315, 220/318, 322, 573.1, 287, 754, 756, 760; 215/319, 273, 286, 287, 290, 291, 293; 206/805; 99/324, 325, 339, 345; 126/373; 292/246, 288, DIG. 11, 259 R; 24/300; D7/360, 387, 394

(56) References Cited

U.S. PATENT DOCUMENTS

| 1,207,974 | A | * | 12/1916 | Miller ........................ 220/315 |
| 1,232,385 | A | * | 7/1917 | Palmer ...................... 220/315 |
| 1,271,230 | A | * | 7/1918 | Sabo ......................... 220/315 |
| 1,483,255 | A | * | 2/1924 | Tonge ........................ 220/315 |
| 2,687,318 | A | * | 8/1954 | Cooper ...................... 220/315 |
| 3,133,665 | A | * | 5/1964 | Colhouer ................... 220/315 |
| 3,363,924 | A | * | 1/1968 | Remig ....................... 220/315 |
| 3,746,205 | A | * | 7/1973 | Helguera ................ 126/377.1 |
| 4,413,851 | A | * | 11/1983 | Ritter ..................... 292/259 R |
| 4,545,501 | A | * | 10/1985 | DeFord ..................... 220/318 |
| D388,657 | S | * | 1/1998 | Bacharowski ............. D7/387 |
| 6,102,238 | A | * | 8/2000 | Brady et al. .............. 220/315 |

* cited by examiner

Primary Examiner—Nathan J. Newhouse
(74) Attorney, Agent, or Firm—John V. Bianco, Esq.

(57) ABSTRACT

The invention, in one embodiment, is directed to a lid securing device. The device includes a first end adapted to interfit over a first handle of a container, a second end adapted to interfit over a second handle of the container, and an intermediate portion extending between the first end and the second end and adapted to engage a lid to exert a securing force between the lid and a container. Optionally, a portion of the device is elastic to further enhance the securing force between the container and the lid.

7 Claims, 7 Drawing Sheets

DEVICE FOR SECURING A LID ON A CONTAINER

FIELD OF THE INVENTION

The invention to apparatus for securing lids on containers. More particularly, in one embodiment, the invention relates to apparatus for securing lids on cookware.

BACKGROUND OF THE INVENTION

It has long been a challenge to secure lids on containers. One example relates to securing lids on cookware, such as ovenware and stoveware. As used herein, the term ovenware includes any type of container adapted for holding a food or beverage during cooking within an oven, and stoveware includes any type of container adapted for holding a food or beverage during cooking on a stove. Some cookware may serve as both ovenware and stoveware.

Often, people wish to transport food in cookware. Such can be the case with both professional caterers, and also with individuals. One challenge in such transportation occurs with beverages or when the food includes a liquid or semi-liquid component, such as a gravy, sauce, puree, broth or the like. In these cases, lids can become unsecured during transportation, causing the food or beverage contained within the cookware to spill. Thus, an object of the invention is to provide a solution to this problem.

This and other objects will be apparent with the following description of an illustrative embodiment of the invention.

SUMMARY OF THE INVENTION

The invention, in one embodiment, is directed to a device for securing a lid on a container. In one embodiment, the lid securing device includes a first end adapted to interfit over a first handle of a container, a second end adapted to interfit over a second handle of the container, and an intermediate portion extending between the first end and the second end and adapted to engage the lid to exert a securing force between the container and the lid. According to one feature, the first end of the lid securing device includes a tab adapted to aid a user in interfitting the first end over the first handle. According to a related feature, the second end of the lid securing device also includes a tab adapted to facilitate a user interfitting the second end over the second handle. According to another feature, the intermediate portion of the lid securing device is further adapted to fit around a lid handle.

In one embodiment, the intermediate portion includes a first subsection adapted to exert a first force on the lid handle, and a second subsection is adapted to exert a second force on the lid handle, wherein the first force substantially opposes the second force. According to another embodiment, the intermediate portion includes a first subsection and a second subsection, and the first subsection and the second subsection are adapted to independently engage the lid handle. According to a further feature, the first subsection and the second subsection are slidingly mechanically coupled to each other.

According to another embodiment, at least a portion of the lid securing device portion is elastic, enabling the lid securing device to stretch across the lid to enhance the securing force exerted between the lid and the container. In a related embodiment, a subsection of the intermediate portion is elastic in nature. In another related embodiment, at least a part of at least one of the first and second ends is elastic in nature.

In an alternative embodiment, the invention is directed to a lid securing device including a first securing element and a second securing element. The first securing element has, a first end adapted to interfit over a first handle of a container, a second end adapted to interfit over a lid handle, and an intermediate portion extending between the first end and the second end and adapted to engage a portion of the lid, and thus exert a first securing force between the container and the lid. The second securing element has, a first end adapted to interfit over a second handle of the container, a second end adapted to interfit over the lid handle, and an intermediate portion extending between the first end and the second end and adapted to engage a portion of the lid, and thus exert a second securing force between the container and the lid.

According to one feature, the first end of the first securing element includes a first tab adapted to facilitate a user interfitting the first end of the first securing element over the first handle of the container. According to a related feature, the first end of the second securing element includes a second tab, adapted to facilitate a user interfitting the first end of the second securing element over the second handle of the container. According to another feature, at least a part of at least one of the first and second securing elements are elastic, enabling the lid securing device to stretch across the lid to enhance the first and second securing forces exerted between the lid and the container.

According to a further embodiment, the container is cookware. In a further embodiment, the container is stoveware. Alternatively, the container is ovenware.

In another embodiment, the invention is directed to a lid securing device including a first end adapted to interfit over a first handle of a container, a second end adapted to interfit over a lid handle, and an intermediate portion extending between the first end and the second end and adapted to engage a portion of the lid, and thus exert a securing force between the container and the lid.

According to one feature, the first end of the lid securing device includes a tab adapted to facilitate a user interfitting the first end of the securing device over the first handle. According to another feature, at least a portion of the lid securing device is elastic, enabling the lid securing device to stretch across the lid to enhance the securing force between the lid and the container. In one aspect of the invention, the container is ovenware or stoveware.

In further embodiments, the invention provides additional features for securing a lid to a container.

BRIEF DESCRIPTION OF THE DRAWINGS

The subject matter regarded as the invention is particularly pointed out and distinctly claimed in the concluding portion of the specification. The invention, however, both as to organization and methods of practice, together with further objects and advantages thereof, may best be understood by reference to the following illustrative description taken in conjunction with the accompanying drawings in which like numerals refer to like elements, elements may not be depicted to scale, and in which:

DESCRIPTION OF THE ILLUSTRATIVE EMBODIMENT

The invention relates to a device for securing a lid to a container. Illustratively, the invention is described in terms of the container being cookware, preferably ovenware or stoveware. However, the invention is applicable for securing a lid on any type of container having handle-like protrusions.

Figure 1A:
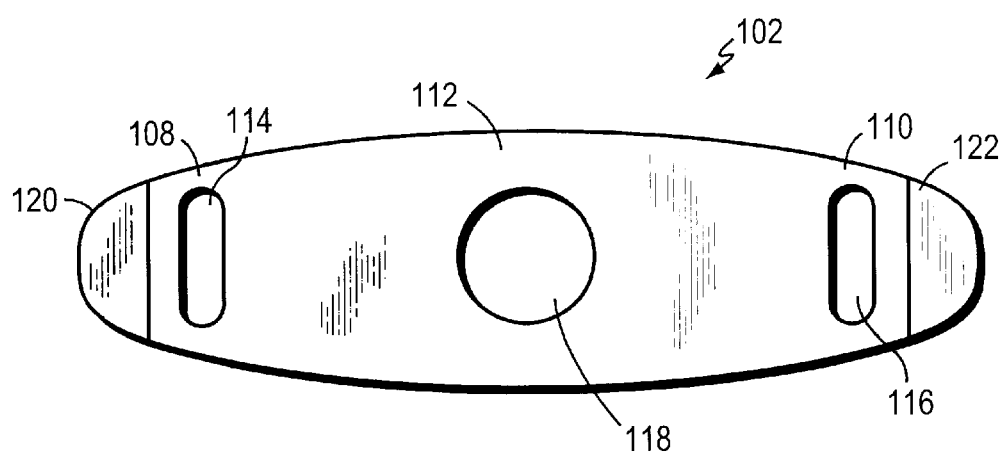
FIGS. 1A is a top view of a lid securing device according to an illustrative embodiment of the invention.
Figure 1B:
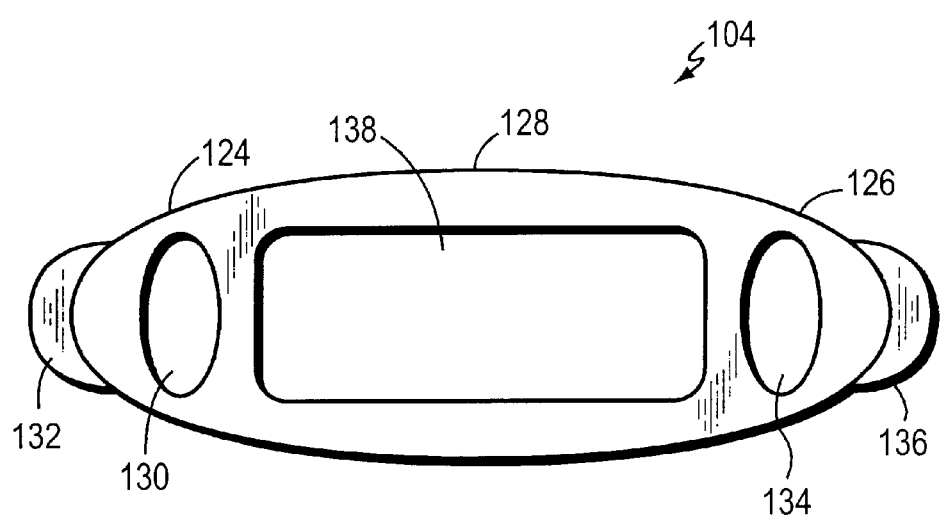
FIG. 1B is a top view of a lid securing device according to another embodiment of the invention.
Figure 1C:
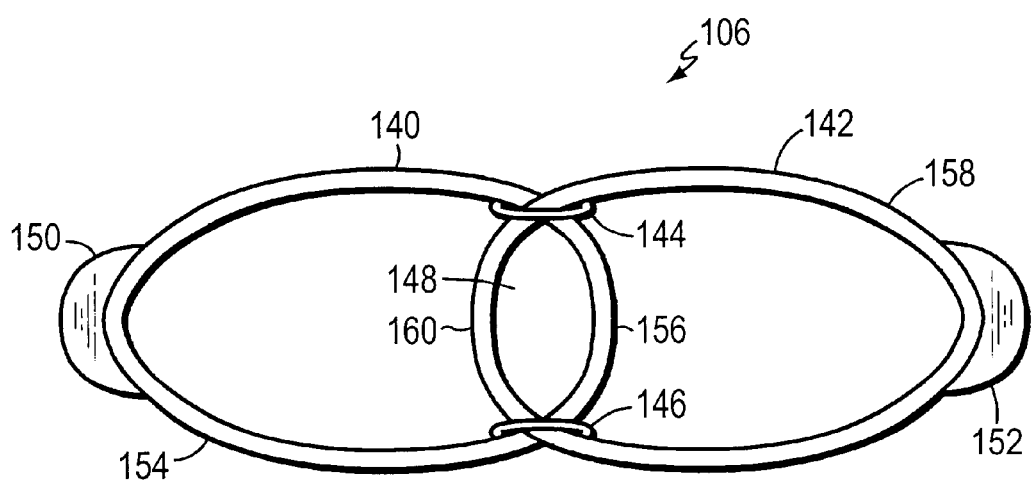
FIG. 1C is a top view a lid securing device according to a further embodiment of the invention.

FIGS. 1A–1C depict top views of lid securing devices according to illustrative embodiments of the invention. More specifically, FIG. 1A is a top view of a lid securing device 102; FIG. 1B is a top view of a lid securing device 104; and FIG. 1C is a top view of a lid securing device 106. The devices 102, 104 and 106 are preferably fabricated from an elastic material, either organic or synthetic. According to one illustrative feature, the devices 102, 104 and 106 are fabricated from a rubber or polymer material that is sufficiently heat tolerant to enable a user to bake food in a container with the device 102, 104 or 106 attached. In an exemplary embodiment, the material from which the devices 102, 104 and 106 are manufactured is heat tolerant up to about five hundred degrees Fahrenheit. In a further exemplary embodiment, the material from which the devices 102, 104 and 106 is manufactured is heat tolerant up to about six hundred degrees Fahrenheit. In another exemplary embodiment, the material from which the devices 102, 104 and 106 is manufactured is heat tolerant up to about seven hundred degrees Fahrenheit.

Referring to FIG. 1A, the device 102 has a first end portion 108, a second end portion 110, and an intermediate portion 112. The first end portion 108 includes an aperture 104 and a tab 120. The second end portion 110 includes an aperture 116 and a tab 122. The intermediate portion 112 includes an aperture 118.

Figure 2:
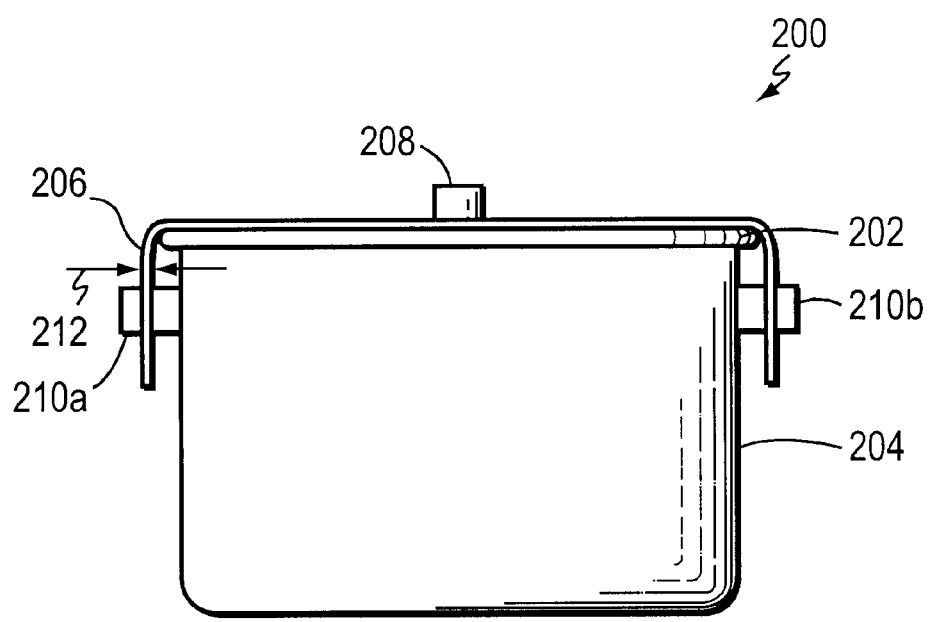
FIG. 2 is a side view of a lid securing device, according to an illustrative embodiment of the invention, securing a lid to a container.

FIG. 2 is a side view 200 of a lid 202 secured to cookware (e.g., a pot) 204 by a lid securing device 206, wherein the lid securing device 206 can be, for example, any of the securing devices 102, 104 and 106. As shown, the lid 202 includes a lid handle 208, and the pot 204 includes two opposing, radially protruding handles 210a and 210b.

Figure 3A:
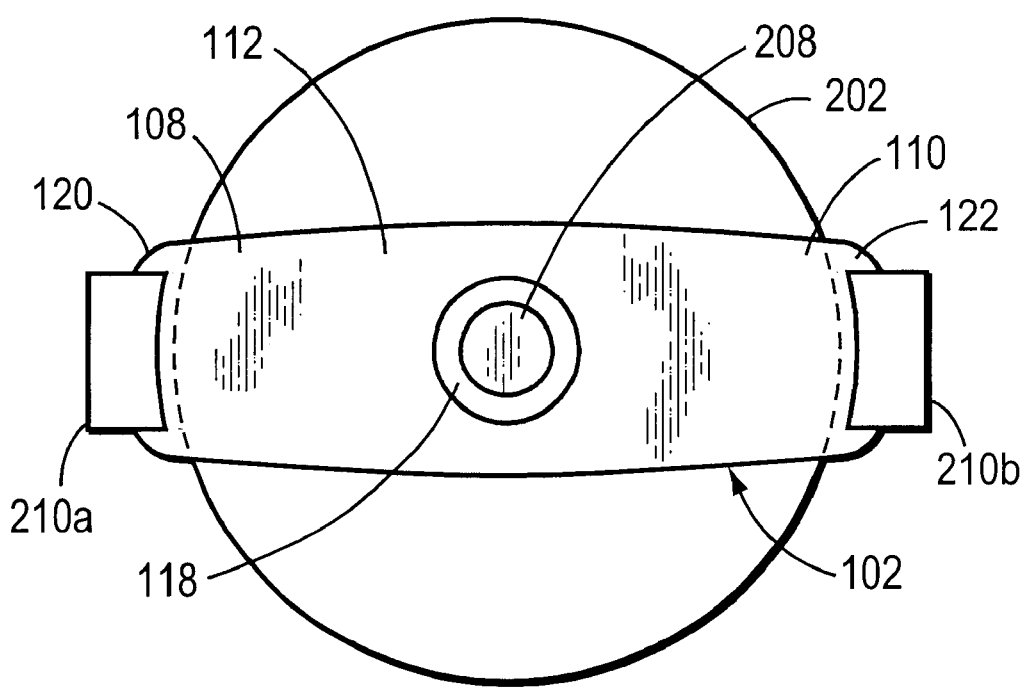
FIG. 3A is a top view of the device of FIG. 1A securing a lid to a container according to an illustrative embodiment of the invention.

FIG. 3A is a top view of the lid 202 and pot 204 combination of FIG. 2, with the lid securing device 102 securing the lid 202 to the pot 204. Referring to FIGS. 1A, 2 and 3A, when installed, the handle 210a fits through the aperture 114. Similarly, the handle 210b fits through the aperture 116. As the intermediate portion 112 extends across and engages the lid 202, the lid handle 208 fits through the aperture 118. Although the securing device 102 can be fabricated as a one size fits all device, the illustrated lid securing device 102 is sized according to the size of the pot 204, such that when installed, the lid securing device 102 exerts a securing force between the lid 202 and the pot 204 to hold the lid 202 snugly on the pot 204. According to a further feature, at least a portion of the lid securing device 102 is manufactured from an elastic material enabling a user to install the lid securing device 102 by stretching it across the lid 202 to engage the apertures 108 and 116 with the handles 210a and 210b, respectively. Preferably, the device 102 is appropriately elastic to enhance the securing force exerted by the device 102 on the lid 202 and the pot 204.

The embodiment of FIG. 1A also provides the tab 120 adjacent to the aperture 114 and the tab 122 adjacent to the aperture 116. The tabs 120 and 122 provide portions to which a user can hold to aid in the installation of the lid securing device 102 onto the lid 202 and pot 204 combination. Although, the thickness 212 of the lid securing device is not a critical aspect of the invention, in a preferred embodiment, the devices 102, 104 and 106 are between about 50 mils and about 500 mils thick.

Referring to FIG. 1B, the device 104 has a first end portion 124, a second end portion 126, and an intermediate portion 128. The first end portion 124 includes an aperture 130 and a tab 132. The second end portion 126 includes an aperture 134 and a tab 136. The intermediate portion 128 includes an aperture 138. In contrast to the lid securing device 102, the aperture 138 is sized larger than the aperture 118. In this way, the device 104 uses less material during fabrication than does the device 102.

Figure 3B:
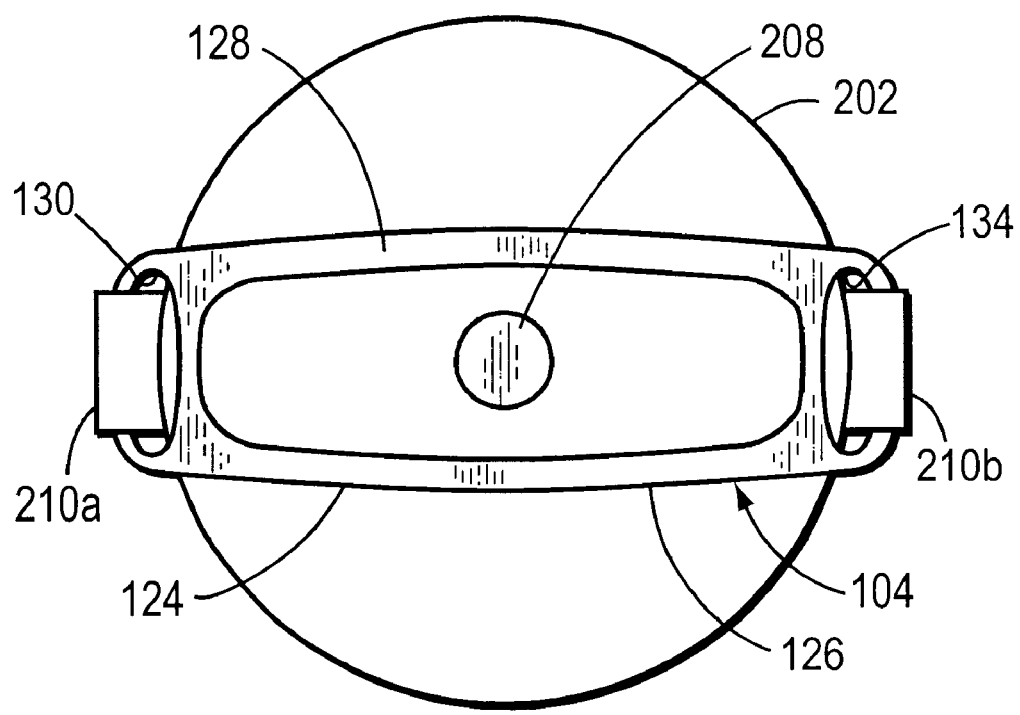
FIG. 3B is a top view of the device of FIG. 1B securing a lid to a container according to an illustrative embodiment of the invention.

FIG. 3B is a top view of the lid 202 and pot 204 combination of FIG. 2, with the lid securing device 104 securing the lid 202 to the pot 204. Referring to FIGS. 1B, 2 and 3B, when installed, the handle 210a fits through the aperture 130. Similarly, the handle 210b fits through the aperture 134. As the intermediate portion 128 extends across and engages the lid 202, the lid handle 208 fits through the oversized aperture 138. As with the device 102, the lid securing device 104 can be fabricated as a one size fits all devoce or can be sized according to the size of the pot 204. Either way, when installed, the lid securing device 104 exerts a securing force between the lid 202 and the pot 204 to hold the lid 202 snugly on the pot 204. According to a further feature, at least a portion of the lid securing device 104 is manufactured from an elastic material enabling a user to install the lid securing device 104 by stretching it across the lid 202 to engage the apertures 130 and 134 with the handles 210a and 210b, respectively. Preferably, the device is appropriately elastic to enhance the securing force exerted by the device 104 on the lid 202 and the pot 204.

In a similar fashion to the device 102, the device 104 of FIG. 1B provides the tab 132 adjacent to the aperture 130 and the tab 136 adjacent to the aperture 134. The tabs 132 and 136 provide portions to which a user can hold to aid in the installation of the lid securing device 104 onto the lid 202 and pot 204 combination.

Referring to FIG. 1C, the device 106 has a section 140 and a second section 142. The first section 140 and the second section 142 are movably and slidingly coupled together, by way of the rings 144 and 146, to form an aperture 148. The rings 144 and 146 can be made of, for example, plastic, metal or fabric. The first section 140 has a first end 154 and a second end 156. Similarly, the second section 142 has a first end 158 and a second end 160. In the illustrative embodiment, the first section 140 includes a tab 150 at the end 154, and the second section 142 includes a tab 152 at the end 158.

Figure 3C:
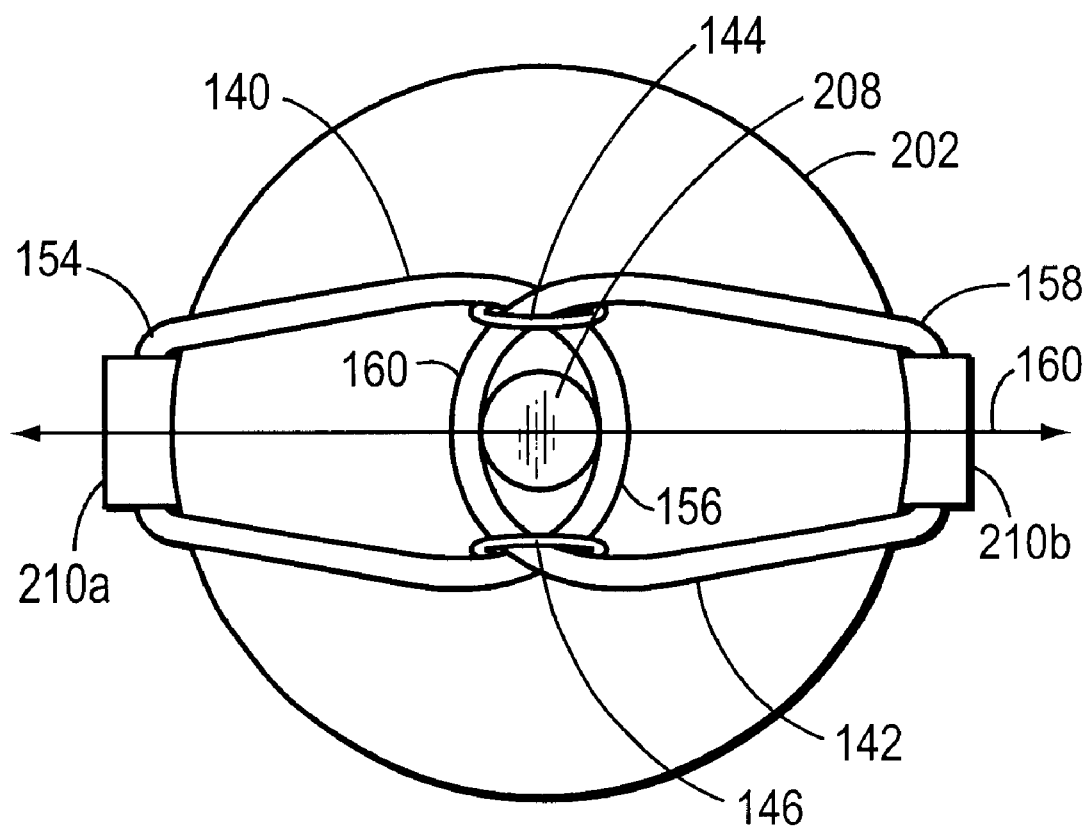
FIG. 3C is a top view of the device of FIG. 3C securing a lid to a container according to an illustrative embodiment of the invention.

FIG. 3C is a top view of the lid 202 and pot 204 combination of FIG. 2, with the lid securing device 106 securing the lid 202 to the pot 204. Referring to FIGS. 1C, 2 and 3C, when installed, the end 154 of the section 140 fits over the handle 210a. Similarly, the end 158 of the section 142 fits over the handle 210b. The lid handle 208 fits through the aperture 148 created by the overlapping ends 156 and 160. As with the device 102, the lid securing device 106 can be fabricated as a one size fits all device or can be sized according to the size of the pot 204. Either way, when installed, the lid securing device 106 exerts a securing force between the lid 202 and the pot 204 to hold the lid 202 snugly on the pot 204. According to a further feature, at least a portion of the each section 140 and 142 of the lid securing device 106 is manufactured from an elastic material enabling a user to install the lid securing device 106 by stretching the section 140 across the lid 202 between the lid handle 208 and the pot handle 210*a*, and the section 142 across the lid 202 between the lid handle 208 and the pot handle 210*b*. In so stretching the sections 140 and 142, the sections 140 and 142 slide with respect to each other through the rings 144 and 146, and the ends 156 and 160 engage and exert opposing forces on the lid handle 208 along the axis 160. The opposing forces exerted on the lid handle 208 by the ends 156 and 160 act to further stabilize the position of the lid 202 on the pot 204. In a preferred embodiment, the device 106 is appropriately elastic to enhance the securing forces exerted between the lid 202 and the pot 204 and on the lid handle 208.

In a similar fashion to the device 102, the device 106 of FIG. 1C provides the tabs 150 and 152 for a user to hold to aid in the installation of the lid securing device 104 onto the lid 202 and pot 204 combination.

In a related embodiment, the lid securing device 106 can be fabricated without the rings 144 and 146, and the sections 140 and 142 can be employed as individual lid securing devices.

Although, the devices 102, 104 and 106 are depicted in various substantially ellipsoid configurations, skilled artisans will appreciate that lid securing devices according to the invention can accommodate numerously shaped containers and lids by configuring the lid securing device to have a shape that enables the device to span at least a portion of the lid of the container and to engage at least one handle-like protrudence from the container to exert a securing force between the container and the lid. Skilled artisans will also appreciate that securing devices according to the invention can be sized for substantially any size container.

What is claimed is:

1. A lid securing device comprising,
    a first section for exerting a first securing force between a lid and a container and having a first end for interfitting over a first handle of said container and a second end for interfitting over a handle of said lid,
    a second section for exerting a second securing force between said lid and said container and having a first end for interfitting over a second handle of said container and a second end for interfitting of said handle of said lid, and
    wherein said first section and said second section moveably interfit with each other.

2. The lid securing device of claim 1, wherein said first end of said first section includes a first tab for facilitating a user interfitting said first end of said first section over said first handle of said container.

3. The lid securing device of claim 2, wherein said first end of said second section includes a second tab, for facilitating a user interfitting said first end of said second section over said second handle.

4. The lid securing device of claim 1, wherein said second end of said first section, when interfitted over said handle of said lid, exerts a first force on said handle of said lid, and said second end of said second section, when interfitted over said handle of said lid, exerts a second force on said handle of said lid, and wherein said first force substantially opposes said second force.

5. The lid securing device of claim 1, wherein at least a portion of said lid securing device is elastic enabling said lid securing device to stretch across said lid to enhance said first and second securing forces between said lid and said container.

6. The lid securing device of claim 1, wherein said lid securing device is sufficiently heat tolerant to enable a user to bake food in said container while said lid securing device is attached to said container.

7. The lid securing device of claim 1, comprising one or more rings for moveably interfitting said first section and said second section.

* * * * *